June 27, 1950 W. H. STOUT ET AL 2,512,695
DRAIN VALVE FOR PIPE LINES
Filed Jan. 10, 1949 2 Sheets-Sheet 1

INVENTORS
WILLIAM H STOUT
JOHN B TERRILL JR.
BY
ATTORNEY

June 27, 1950  W. H. STOUT ET AL  2,512,695
DRAIN VALVE FOR PIPE LINES
Filed Jan. 10, 1949  2 Sheets-Sheet 2
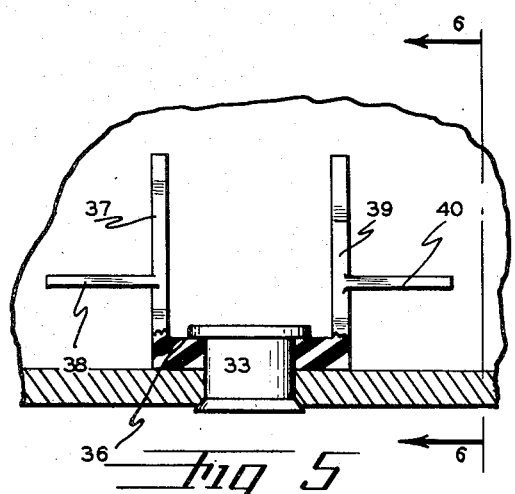
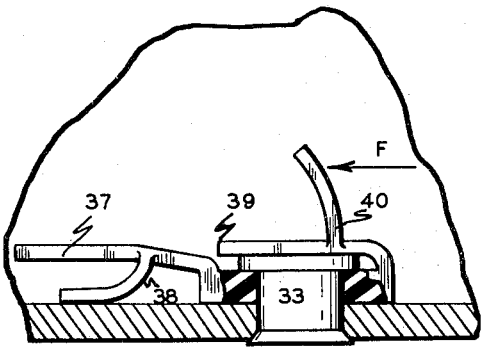
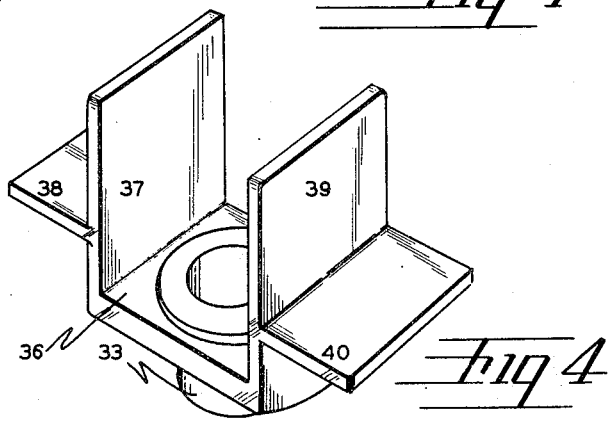
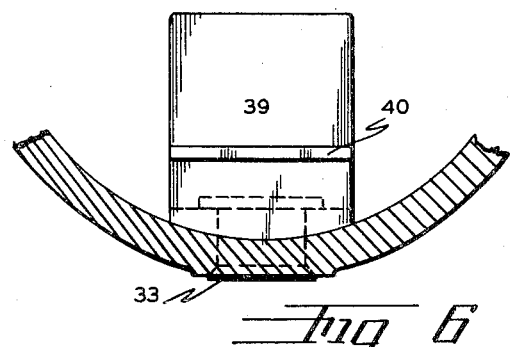
*INVENTORS*
WILLIAM H. STOUT
JOHN B. TERRILL JR.
BY
*F. R. Geisler*
ATTORNEY Patented June 27, 1950

2,512,695

UNITED STATES PATENT OFFICE 2,512,695

DRAIN VALVE FOR PIPE LINES

William H. Stout and John B. Terrill, Jr., Portland, Oreg.; said Terrill assignor to Stout Irrigation, Inc., Portland, Oreg., a corporation of Oregon Application January 10, 1949, Serial No. 70,096

5 Claims. (Cl. 277—71)

1

This application is a companion of our application of even date entitled "Automatic Drain Valve" and, like said application, relates to a valve designed to provide for automatic draining of water or liquid from a pipe line whenever the flow of the water of liquid therethrough has been shut off.

The present invention, like the invention covered by the companion application, relates particularly to the draining of surface irrigation pipe lines preparatory to the moving of the line as a unit.

To enable a surface irrigation pipe line to be dragged across a field from one location to another without being dismantled, it becomes necessary to drain the water from the entire pipe line first. Otherwise the weight of the water in the pipe line will render the moving of the line as a unit a difficult if not impossible undertaking.

The object of the present invention is to provide an improved drain valve, adapted to be installed at frequent intervals along the pipe line and particularly along a surface irrigation pipe line, which will act automatically to open up a drain outlet whenever the water is shut off, and which correspondingly will act to seal the drain outlet during the time the water is turned on.

The manner in which this object is accomplished by our improved drain valve, and the construction and operation of our improved valve embodying the present invention will become apparent from the following brief description and explanation, with reference to the accompanying drawings in which:

Fig. 4 is a perspective view of the modification of the drain valve of the preceding figures;

Fig. 5 is a sectional elevation showing the modified drain valve of Fig. 4 installed in a pipe line and illustrating the valve in open or draining position;

Fig. 6 is an elevation of the valve taken on line 6—6 of Fig. 5;

2

Figure 9:
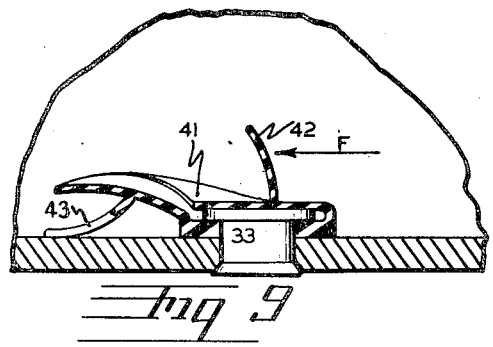
Figure 8:
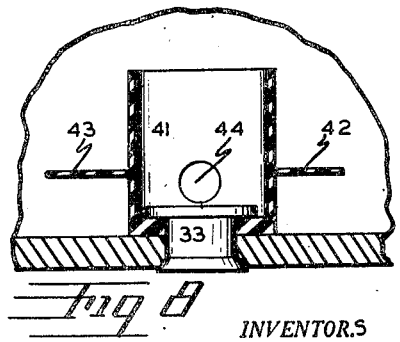

Fig. 7 is a sectional elevation similar to Fig. 5 but showing the same valve automatically closed as the result of the normal flow and subsequent pressure of the liquid in the pipe line;

Fig. 8 is a sectional elevation showing a further modified form of our drain valve and illustrating the same in open position; and Fig. 9 is a corresponding sectional elevation showing the valve of Fig. 8 automatically closed.

Figure 1:
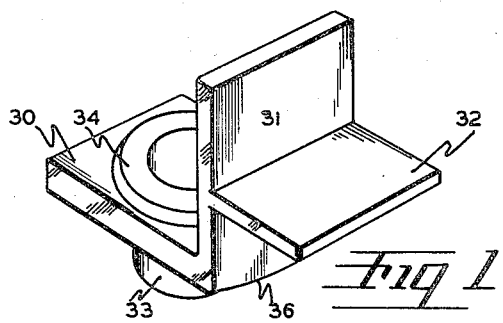
Fig. 1 is a perspective view of the drain valve by itself showing the valve prior to its installation in a pipe section or coupling section of a pipe line.

Our drain valve, as illustrated in Fig. 1, comprises an integral pre-formed member, made of any suitable flexible and resilient material, and the valve has a base portion 30, an upstanding flap or wall portion 31 which normally extends upward from one side edge of the base approximately at right angles to the plane of the top face of the base, and a fin 32 extending from the outer face of the wall or flap 31, normally extending approximately at right angles to the face of the wall or flap 31 and centrally located on the wall or flap 31, substantially as shown in Fig. 1. The base portion 30, the wall or flap 31, and the fin 32 are preferably, though not necessarily, rectangular in shape. The top face of the base portion 30 is substantially flat, but the bottom face 36 (Fig. 1) is preferably formed convex and with a curvature approximately corresponding to the curvature of the inside wall of the pipe or coupling section in which the drain valve is to be installed.

A central opening extends through the base portion 30 and a metal sleeve 33 extends through the opening. The sleeve 33 has a top peripheral flange 34 which engages the base portion 30 of the valve. When the valve is to be mounted in a pipe section or coupling section, a hole is made in the pipe section or coupling section corresponding in size approximately to the diameter of the sleeve 33, and the sleeve is then inserted in the hole and finally the bottom or outside end of the sleeve is deformed outwardly, as shown at 35 in Fig. 2, so as to hold the sleeve and therewith the valve firmly in place in the pipe section or coupling section. preferably the valve is mounted in a coupling section.

Figure 2:
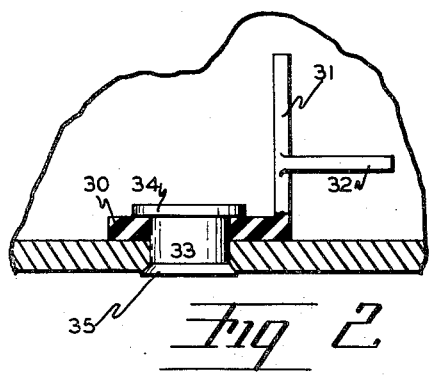
Fig. 2 is a sectional elevation of our drain valve installed in a pipe line, showing the valve in open or draining position.

The valve, when set in place in the pipe line, is so positioned that the normally upstanding flap 31 will be substantially perpendicular to the axis of the pipe line and will be located ahead of the sleeve 33 with respect to the normal direction of the flow of liquid in said pipe line. Then when the liquid flows through the pipe line the moving liquid will exert a force against the resilient flap and bend it downward over the top of sleeve 33 and thus over the drain port through the sleeve. Fig. 2 illustrates the position of the valve when the normal flow of water through the pipe line is not taking place, and Fig. 3 illustrates the same valve during the normal flow of liquid in the pipe line, the direction of such normal flow being indicated by the arrow F.

Figure 3:
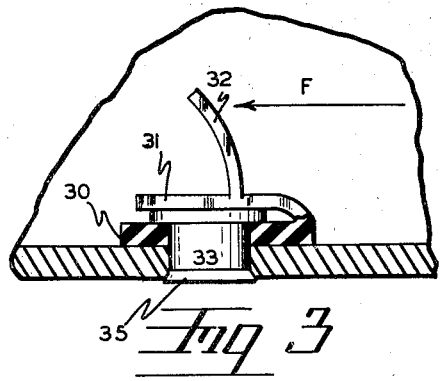
Fig. 3 is a similar section showing the drain valve automatically closed as the result of the normal flow and subsequent pressure of the liquid in the pipe line.

When the valve is formed as illustrated in Figs. 1, 2 and 3, and made of heavy rubber or similar flexible resilient material, the normal flow of liquid through the pipe line (thus in the direction indicated by the arrow F in Fig. 3), will act not only against the flap 31, but, as the flap 31 bends over under the impact, the flowing liquid will also act against the fin 32. Thus, if the flow of the liquid in the pipe line is not strong enough, in view of the thickness and resiliency of the hinge portion of the flap 31, or due to the slow rate of flow, to cause the flap 31 to bend over far enough to cause partial closing of the drain port through the sleeve 33, the fin 32, under such circumstances, being then subjected to the impact of the flowing liquid, will cause additional leverage to be exerted on the flap 31 so as to bring this flap down into the desired position over the drain port, whereupon the pressure developed in the pipe line, as the flow of liquid in the pipe line is made to continue, will cause the liquid to bear down on the sealing flap with sufficient additional pressure to produce a tight seal.

When the flow of liquid and the pressure in the pipe line are substantially reduced, the flap 31, due to the resiliency of its hinge portion, will then return to its normal upright position illustrated in Fig. 2, uncovering the drain port through the sleeve 33 and permitting the liquid in the pipe line in the area in which the drain valve is located to drain out through the sleeve 33. Upon resumption of the normal delivery of liquid into the pipe line, the flap 31 and its assisting fin 32, acted upon by the flow of the liquid, will again cause the flap 31 to bend down into closing position over the drain port and then in cooperation with the liquid pressure being built up in the pipe line, cause the flap to seal the drain port.

Thus the addition of the fin 32 enables the flap 31, and in particular, the hinge portion of the flap, to be made heavier or thicker and enables the flap to respond satisfactorily to a slower rate of the flow of liquid through the pipe line than would be the case if this fin were omitted.

In Figs. 4, 5 and 7, we show our valve formed with two oppositely-positioned identical flaps 37 and 39 which normally extend in substantially parallel planes from the top face of the base portion 36. Fins 38 and 40 extend substantially at right angles from the outside faces of these flaps 37 and 39, respectively, as shown in Fig. 4. Fig. 5 shows this double-flap valve installed in a pipe line, the two flaps extending substantially perpendicular to the axis of the pipe line whenever the flow of liquid through the pipe line is not taking place. Fig. 7 illustrates this double-flap valve when the flow of liquid through the pipe line is taking place in the direction indicated by the arrow F.

Obviously, referring to Fig. 7, if the flow of liquid through the pipe line were in the opposite direction from that indicated in the figure, the relative positions of the two flaps would be reversed and flap 37, instead of flap 39, would then act as the sealing flap. Consequently when our valve is made with two flaps the valve can function when the flow of liquid through the pipe line takes place in either direction.

A further modification of our improved automatic drain valve is shown in Figs. 8 and 9. In this modified form a relatively thin cylindrical or tubular wall 41 extends upward from the perimeter of the base portion and takes the place of the two flaps of Fig. 4. Identical horizontal fins 42 and 43 each extend for about 90° around the wall at diametrically opposite locations on the outside of the wall 31 and in the relative position shown in Fig. 8. These fins correspond substantially in position and arrangement to the fins 40 and 38 of the two-flap valve of Figs. 4 and 5.

Due to the fact that the cylindrical or tubular wall 41 in this modified form of our invention is thin and flexible, as well as resilient, the flow of liquid through the pipe line in either direction will cause the wall 41 temporarily to collapse. Thus the flow of the liquid in the direction indicated by the arrow F in Fig. 9 will cause the valve to assume the position illustrated in that figure, and a portion of the wall 41 after being bent down over the drain port through the sleeve 33, will then act in the desired manner, as the result of the flow of liquid and the resulting development of the pressure within the pipe line, to seal the drain port. As apparent from Fig. 9, the fin 42, extending from the port-sealing section of the wall, functions in the same manner as the fins previously described to assist in urging the sealing section into desired position for sealing and to aid in holding this position as long as the flow of liquid through the pipe line continues. Obviously similar action takes place should the flow of liquid in the pipe line be in the reversed direction.

When our valve is made with a cylindrical wall in place of a pair of flaps, some provision must be made for the pasage of liquid through the base portion of the wall and out through the drain port when the valve is in open position. Consequently a pair of oppositely-positioned ports 44, one of which is shown in Fig. 8, are provided in the wall 41. These ports are aligned transversely with respect to the pipe line axis, and while large enough to permit the desired draining to take place within a moderately short time, do not extend into those sections of the wall which serve to seal the drain port when the wall is collapsed under the flow of liquid in the pipe line.

We claim:

1. A valve for automatically draining liquid from a pipe line, said valve including a base portion secured within said pipe line, an open drain port extending through said base portion and through the underlying pipe line wall, a flexible resilient element connected with said base portion and normally extending into said pipe line and into the path of the liquid flowing through said pipe line, the resiliency of said element being insufficient to maintain said element in opposition to said liquid flow, a substantially horizontal fin on the outside face of said element extending outwardly away from said drain port in a direction opposite to the direction of normal flow of said liquid in said pipe line, whereby the normal flow of liquid in said pipe line will cause said element to bend down over said drain port and the fin on the outside face of said element to be engaged by said liquid flow and thus to combine with said element in moving said element temporarily into closing position over said drain port to enable the final sealing of said drain port to take place and to continue until the liquid flow and pressure in said pipe line are substantially reduced.

2. A valve for automatically draining liquid from a pipe line, said valve including a base portion secured within said pipe line, an open drain port extending through said base portion and through the underlying pipe line wall, a flexible resilient flap connected with said base portion and normally extending into said pipe line substantially perpendicular to the axis of said pipe line, the resiliency of said flap being insufficient to maintain said flap in opposition to said liquid flow, said flap positioned ahead of said drain port in the normal direction of flow of said liquid, a substantially horizontal fin on the outside face of said flap extending in a direction opposite to the direction of normal flow of said liquid in said pipe line, whereby the normal flow of liquid in said pipe line will cause said flap to bend down over said drain port and the fin on the outside face of said flap to be engaged by said liquid flow and thus to combine with said flap in moving said flap temporarily into closing position over said drain port to enable the final sealing of said drain port to take place and to continue until the liquid flow and pressure in said pipe line are substantially reduced.

3. A valve for automatically draining liquid from a pipe line, said valve including a base portion secured within said pipe line, an open drain port extending through said base portion and through the underlying pipe line wall, a flap connected with said base portion by resilient hinge means and normally extending into said pipe line substantially perpendicular to the axis of said pipe line and into the path of the liquid flowing through said pipe line, the resiliency of said hinge means being insufficient to maintain said flap in opposition to said liquid flow, said flap positioned ahead of said drain port in the normal direction of flow of said liquid, a fin on the outside face of said flap extending outwardly away from said drain port in a direction opposite to the direction of normal flow of said liquid in said pipe line, whereby the normal flow of liquid in said pipe line will cause said flap to bend down over said drainport and the fin on the outside face of said flap to be engaged by said liquid flow and thus to combine with said flap in moving said flap temporarily into closing position over said drainport to enable the final sealing of said drain port to take place and to continue until the liquid flow and pressure in said pipe line are substantially reduced.

4. A valve for automatically draining liquid from a pipe line, said valve including a base portion secured within said pipe line, an open drain port extending through said base portion and through the underlying pipe line wall, a pair of flexible resilient flaps integral with said base portion and normally extending into said pipe line from opposite sides of said base portion substantially perpendicular to the axis of said pipe line, the resiliency of said flaps being insufficient to maintain said flaps in opposition to said liquid flow, a fin on the outside face of each of said flaps, said fins extending in opposite directions outwardly away from said drain port, whereby the flow of liquid in either direction in said pipe line will cause one of said flaps to bend down over said drain port and the corresponding fin on the outside face of said latter mentioned flap to be engaged by said liquid flow and thus to combine with said latter mentioned flap in moving said latter mentioned flap temporarily into closing position over said drain port to enable the final sealing of said drain port to take place and to continue until the liquid flow and pressure in said pipe line are substantially reduced.

5. An automatic valve for draining liquid from a pipe line, said valve comprising a base portion secured within said pipe line, an open drain port extending through said base portion and through the underlying pipe line wall, a flexible resilient wall integral with said base portion and normally extending into said pipe line from the perimeter of said base portion and into the path of the liquid flowing through said pipe line, the resiliency of said flexible wall being insufficient to maintain said flexible wall in opposition to said liquid flow, a pair of fins on the outside face of flexible wall, said fins extending in opposite directions outwardly away from said drain port, whereby the flow of liquid in either direction in said pipe line will cause a portion of flexible wall to bend down over said drain port and the corresponding fin on the outside face of said wall portion to be engaged by said liquid flow and thus to combine with said wall portion in moving said wall portion temporarily into closing position over said drain port to enable the final sealing of said drain port to take place and to continue until the liquid flow and pressure in said pipe line are substantially reduced.

WILLIAM H. STOUT.
JOHN B. TERRILL, JR.

REFERENCES CITED

The following references are of record in the file of this patent:

UNITED STATES PATENTS

| Number | Name | Date |
|---|---|---|
| 2,461,304 | Wilson | Feb. 8, 1949 |

FOREIGN PATENTS

| Number | Country | Date |
|---|---|---|
| 178,626 | Great Britain | Apr. 27, 1922 |